No. 823,740. PATENTED JUNE 19, 1906.
J. A. REAMS.
DOUGH MIXING MACHINE.
APPLICATION FILED JAN. 25, 1905. RENEWED MAY 22, 1906.
2 SHEETS—SHEET 1.
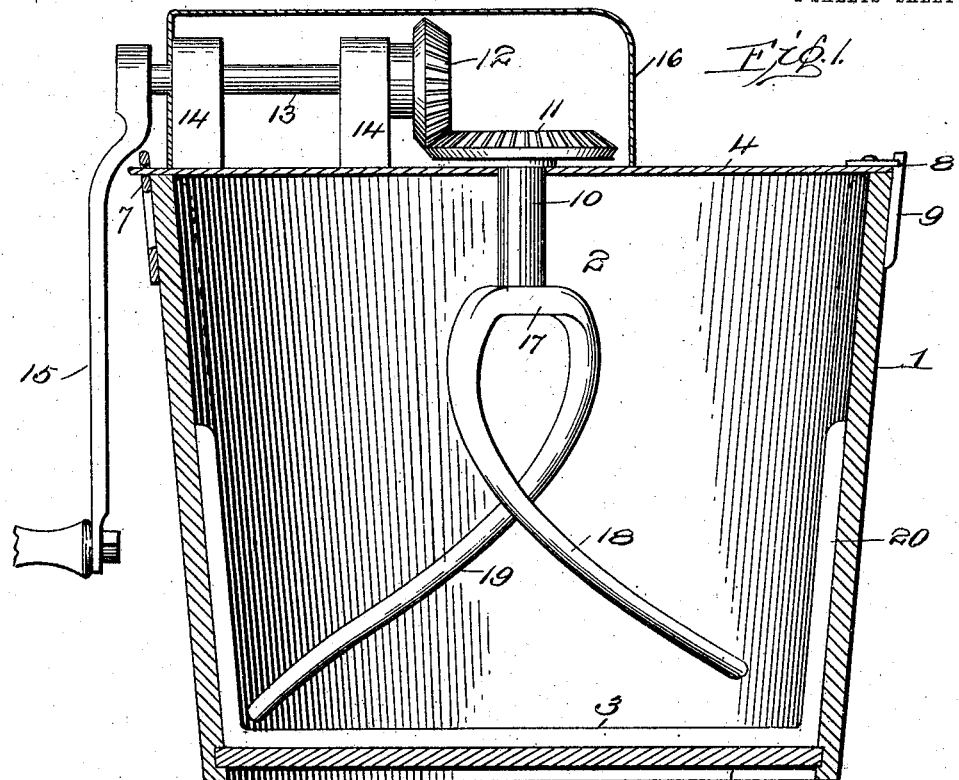
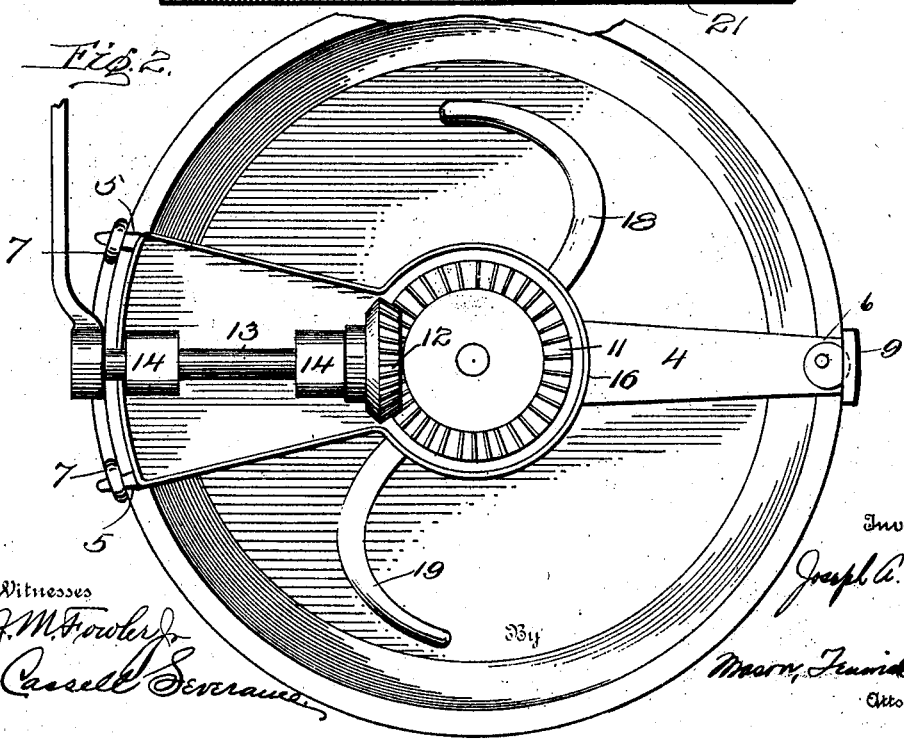

No. 823,740. PATENTED JUNE 19, 1906.
J. A. REAMS.
DOUGH MIXING MACHINE.
APPLICATION FILED JAN. 25, 1905. RENEWED MAY 22, 1906.
2 SHEETS—SHEET 2.
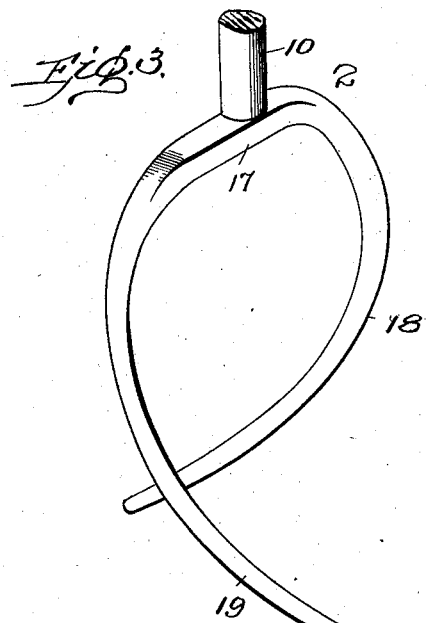
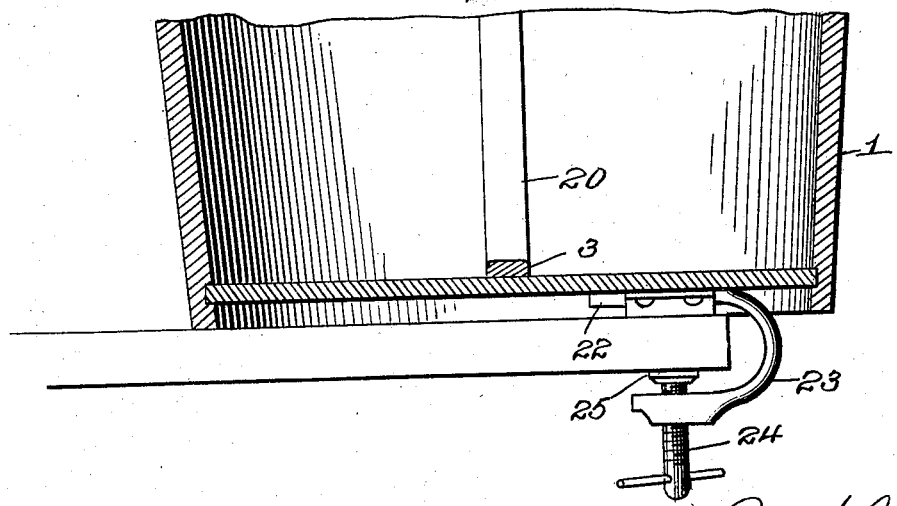

UNITED STATES PATENT OFFICE.

JOSEPH A. REAMS, OF NORFOLK, VIRGINIA, ASSIGNOR OF ONE-HALF TO THOMAS K. PARRISH, OF RICHMOND, VIRGINIA.

DOUGH-MIXING MACHINE.

No. 823,740.   Specification of Letters Patent.   Patented June 19, 1906.

Application filed January 25, 1905. Renewed May 22, 1906. Serial No. 318,229.

*To all whom it may concern:*

Be it known that I, JOSEPH A. REAMS, a citizen of the United States, residing at Norfolk, in the county of Norfolk and State of Virginia, have invented certain new and useful Improvements in Dough-Mixing Machines; and I do hereby declare the following to be a full, clear, and exact description of the invention, such as will enable others skilled in the art to which it appertains to make and use the same.

This invention relates to improvements in mixing apparatus, and has particular reference to a mechanism suitable for mixing or preparing dough for breadstuffs, cake, or the like.

The invention consists in certain novel constructions, combinations, and arrangements of parts, as will be hereinafter described and claimed.

In the accompanying drawings, forming a part of this application, Figure 1 is a centrally vertical section through my improved mixing apparatus, parts of the mechanism being shown in elevation. Fig. 2 is a top plan view of the same, a portion of the casing for inclosing the operating mechanism being shown in section. Fig. 3 is a detail perspective view showing the dough-kneading arms. Fig. 4 is a detail sectional view showing the mixing vessel clamped upon the edges of a table or similar support.

The mixing apparatus forming the subject-matter of the present invention is so designed that the materials for forming a dough or food compound may be placed when they are being assembled within the receptacle or vessel and may there at once be engaged by the stirring, mixing, and rolling or kneading arms or bars to reduce the material to a mass of proper consistency. In the accompanying drawings I have illustrated the apparatus in its preferred form, and in said drawings 1 indicates a receptacle, bucket, or tub; 2 a mixing or kneading device mounted therein, and 3 a retarding device secured within the receptacle or vessel 1. Although it will be apparent that I might employ any kind of a vessel, tub, receptacle, or closure without departing from the spirit of the invention, I preferably use a receptacle, such as that shown in the drawings, which is made in about the dimensions of an ordinary bucket. This receptacle may be made of any desired material, either of iron, fiber, papier-mâché; but I find for ordinary use that a wooden bucket or receptacle fills all of the requirements of the case and that such a receptacle is both light and inexpensive and well adapted for the purpose desired.

The dough-engaging device within the receptacle is supported by a cross plate or bar 4, which is mounted upon the top of the vessel, and the said bar may be removably secured thereon, as indicated in the drawings, by providing securing-lugs 5 at one end and a cam 6 at the other end. The lugs 5 are inserted in apertured projections 7, secured to the walls of the receptacle 1, while the cam 6 engages a notch or groove 8, formed in a standard or bar 9, secured to the bucket upon the opposite side thereof from the projections 7. Mounted upon the central portion of the bar 4 is a vertical shaft 10, which has a bearing formed in the bar 4 and carries an actuating-gear 11, which rests upon the upper side of the bar. The gear 11 is preferably a beveled gear and is engaged by a beveled pinion 12, which is secured to a drive-shaft 13. The drive-shaft 13 is mounted upon bearing-standards 14, secured to the bar or plate 4, and its outer end is provided with an operating handle or crank 15, by which it may be turned. The beveled gears 11 and 12 and the greater portion of the shaft 13 are inclosed within a housing 16 to exclude dirt or the clogging of the gears with dough or other material placed in or taken from the receptacle 1.

The formation of the stirring and kneading member 2 is an important feature of the invention. The said member is provided with a body portion or cross-head 17, which is rigidly secured to the lower end of the shaft 10, so as to turn therewith. The cross-head 17 preferably projects to one side of the shaft 10 to a greater extent than upon the other side, and each end of said cross-head carries a downwardly-curved arm, as 18 and 19. The arm 18 is formed upon the short end of the cross-head 17 and curves downwardly and outwardly toward the walls of the receptacle 1 from said cross-head. The arm 19 extends downwardly and outwardly from the long end of the cross-head, as clearly shown in the drawings. The arm 19 projects to a point quite close to the angle formed by the side wall and the bottom of the receptacle, while the arm 18 is stopped somewhat short thereof. As will be evident by an examination of Fig. 2, the shorter bar or arm 18 travels in a path which is not traversed by the bar 19, the said bar 19 operating in a plane outside thereof. In this manner a considerable portion of the dough comes beneath either one or the other of said bars. The curve of each of the arms 18 and 19 is such that the convex edge or surface of each arm faces downwardly and at an incline to the floor or bottom of the receptacle 1. This is important, since the material within the receptacle, especially when it begins to assume the condition of a homogeneous mass, will be rolled and kneaded upon the bottom or floor of the receptacle. The curvature of the arms 18 and 19 lies in each case in the same direction, so that when turning the shaft 10 each of the arms will successively roll upon and knead the dough.

Operating in conjunction with the action of the stirring-arms 18 and 19 I also use a retarding means which is secured to the inner surface of the receptacle or bucket 1. The said retarding means preferably consists in a cleat or bar 3, which extends across the floor or bottom of the receptacle 1 and preferably, also, extends upwardly upon opposite sides of said receptacle, as at 20. The end portions of the cleat or bar 20 may extend only part way up the sides of the receptacle, as shown in Fig. 1, or, as indicated in dotted lines, may extend entirely to the top or upper edge of said receptacle or bucket. I usually form the retarding cleat or bar 3 with a convex outer surface and a flat surface which fits against the walls and bottoms of the said receptacle. As the dough is rolled about in the receptacle or bucket it will be brought into engagement with the cleat 3, which will tend to increase the kneading and properly working together of the dough or other mass operated upon.

For convenience in use the receptacle or vessel 1 is made so that it can be readily secured to a table, bench, or other support, the said receptacle being provided with a socket 21 upon its under surface which receives one arm, as 22, of a bent clamp 23. The lower arm of the clamp 23 is provided with a threaded aperture through which a clamp screw or bolt 24 passes. The inner end of the clamping-screw 24 is provided with a swiveled head 25 for engaging the end surface of the table. When it is desired to secure the vessel or bucket to a table or similar support, it is only necessary to slip the clamp 23 into the clip or socket-piece 21, secured to the bottom of the receptacle, and then place the clamp upon the edge of the table or support, after which the tightening of the screw or bolt 24 will operate to bind the parts tightly in place, the clamp being not only thus held from slipping out of the socket or clip 21, but also from slipping from the edge of the table.

While I have illustrated in the drawings the preferred form of the various portions of the device, yet I wish to be understood as considering minor changes in the details of the structure as within the scope of the invention.

In using the dough-mixer experience shows that the materials for bread, biscuit, cake, or the like can be placed in the receptacle 1 and in a few minutes may be brought to a homogeneous mass in readiness for cooking or further operations.

Having now described my invention, what I claim as new, and desire to secure by Letters Patent, is—

1. A mixing apparatus comprising a receptacle, and a mixing and kneading device mounted therein having downwardly and outwardly increasing spirally-curved ingredient-rolling arms, and means for rotating the same within the receptacle.

2. A mixing apparatus comprising a receptacle, a depending mixing device mounted therein, and having a cross-head, arms curving downwardly and outwardly gradually so as to increase their distance continually from the axis of movement as they approach the bottom of the receptacle, the shape of the arms causing them to produce a rolling and kneading action upon the materials in the receptacle and means for rotating the said mixing device.

3. An ingredient-mixing apparatus, comprising a receptacle, a mixing device revolubly mounted therein and having a plurality of arms curving downwardly for rolling or kneading materials to be mixed, the arms increasing their distance from the axis of motion toward their lower ends, one of said arms starting in its downward curvature from a point nearer the said axis of movement than the other and a retarding means mounted within said receptacle.

4. A mixing apparatus, comprising a receptacle, a revoluble mixing device mounted within the same, downwardly and outwardly curving arms increasing their distance from the center of axis toward their lower ends, the shape of the arms causing them to roll the mixtures in the receptacle, the said arms following each other in movement but in different concentric paths, and means for rotating the said mixing device.

5. A mixing apparatus, comprising a receptacle, a depending device revolubly mounted upon the receptacle, arms of different lengths extending into the receptacle and increasing their distance from the center of axis toward their outer ends, and means for moving the arms about the said center of motion, the shape of the arms facilitating the rolling or kneading of the materials placed in the receptacle.

6. A mixing apparatus, comprising a receptacle, a rotating shaft mounted above the same, a cross-head secured to the said shaft and projecting unequal distances upon opposite sides of the shaft, curved arms extending downwardly from the ends of the cross-head and increasing their distance from the axis of rotation of the shaft continuously toward their outer ends, the curvature of the said arms causing the rolling of the materials beneath them within the receptacle.

7. A dough-mixing apparatus comprising a receptacle, a rotating mixing device extending into the same and having curved dough-rolling arms extending outwardly gradually from the axis of rotation toward the side walls of the receptacle, and a retarding means extending across the bottom of the receptacle and up upon the sides thereof, the said retarding means being rigidly secured both to the bottom and to the sides of said receptacle.

8. A dough-mixing apparatus comprising a receptacle, a rotating, kneading and mixing device mounted therein and having downwardly-convexed arms for rolling upon the dough and a retarding-cleat secured to the inner surface of the receptacle and extending to the center of the receptacle.

9. A dough-mixing apparatus, comprising a receptacle, a stirring and kneading device revolubly mounted therein, having curved arms capable of rolling the dough in the receptacle and a retarding-cleat having a curved surface extending into the receptacle, the said cleat being secured rigidly to the bottom and to the sides of the receptacle.

10. A dough-mixing apparatus comprising a receptacle having a flat bottom, a plurality of curved arms revolubly mounted above the said bottom and curving in downwardly-increasing spiral directions, means for turning the said arms to roll materials upon the bottom of the receptacle and removable means for holding the said mechanism in position upon the receptacle.

In testimony whereof I affix my signature in presence of two witnesses.

JOSEPH A. REAMS.

Witnesses:
   L. A. DAUGHERTY,
   W E. PERKINS.